United States Patent
Buzzetta et al.

(10) Patent No.: US 6,535,319 B2
(45) Date of Patent: Mar. 18, 2003

(54) FREE-SPACE OPTICAL WAVELENGTH ROUTING ELEMENT BASED ON STEPWISE CONTROLLED TILTING MIRRORS

(75) Inventors: Victor Buzzetta, Longmont, CO (US); Bevan Staple, Longmont, CO (US); David Marinelli, Santa Rosa, CA (US)

(73) Assignee: Network Photonics, Inc., Boulder, CO (US)

( * ) Notice: Subject to any disclaimer, the term of this patent is extended or adjusted under 35 U.S.C. 154(b) by 0 days.

(21) Appl. No.: 09/899,000

(22) Filed: Jul. 3, 2001

(65) Prior Publication Data

US 2003/0007721 A1 Jan. 9, 2003

(51) Int. Cl.⁷ ............................................. G02B 26/08

(52) U.S. Cl. ................. 359/225; 359/223; 359/871; 385/18

(58) Field of Search ............................... 385/15, 16, 17, 385/18, 24; 359/221, 225, 849, 872–876

(56) References Cited

U.S. PATENT DOCUMENTS

| | | |
|---|---|---|
| 5,414,540 A | 5/1995 | Patel et al. .................... 359/39 |
| 5,917,625 A | 6/1999 | Ogusu et al. ................ 359/130 |
| 5,960,133 A | 9/1999 | Tomlinson .................... 385/18 |
| 5,999,672 A | 12/1999 | Hunter et al. .................. 385/37 |
| 6,028,689 A | 2/2000 | Michalicek et al. ........ 359/224 |
| 6,040,935 A | 3/2000 | Michalicek ................. 359/198 |
| 6,097,519 A | 8/2000 | Ford ........................... 385/130 |
| 6,097,859 A | 8/2000 | Solgaard ....................... 385/17 |
| 6,108,471 A | 8/2000 | Zhang et al. .................. 385/37 |
| 6,128,122 A | 10/2000 | Drake et al. ................ 359/224 |
| 6,307,657 B1 | 10/2001 | Ford |

OTHER PUBLICATIONS

Rallison, R.D., "Dense Wavelength Multiplexing (DWDM) and the Dickson Grating," White Paper, Jan. 6, 2001.

U.S. patent application Ser. No. 09/442,061, Weverka et al., filed Nov. 16, 1999.

T. Akiyama, et al.; "Controlled Stepwise Motion in Polysilicon Microstructures," Journal of Microelectromechanical Systems, vol. 2, No. 3, Sep. 1993; pp.106–110.

C.M.A. Ashruf, et al., "Galvanic porous silicon formation without external contacts," Sensors and Actuators 74 (1999) pp. 118–122.

Kenneth Bean, et al., "Anisotropic Etching of Silicon," IEEE Transactions on Electron Devices, vol. Ed–25, No. 10, Oct. 1978.

Dino R. Ciarlo, "A latching accelerometer fabricated by the anisotropic etching of (110) oriented silicon wafers," Lawrence Livermore Nat'l Laboratory, Mar. 1, 1992.

A.S. Dewa, et al., "Development of a Silicon Two–Axis Micromirror for an Optical CrossConnect," Solid State Sensors and Actuators Workshop, Hilton Head, South Carolina, pp. 93–96 Jun., 2000.

(List continued on next page.)

*Primary Examiner*—Robert H. Kim
*Assistant Examiner*—Michael H. Caley
(74) *Attorney, Agent, or Firm*—Townsend and Townsend and Crew LLP

(57) ABSTRACT

A microstructure for steering light is provided. A pivot member is connected with a structural film and supports a base that includes a reflective coating. A fixed rotational actuator is connected with the structural film and is configured to rotate the base on the pivot member upon actuation. A movable hard stop is connected with the structural film. The movable hard stop is configured such that in each of a plurality of its positions, the base assumes one of a plurality of tilt positions upon actuation of the fixed rotational actuator.

40 Claims, 12 Drawing Sheets

OTHER PUBLICATIONS

Joseph Ford et al., "Wavelength Add Drop Switching Using Tilting Micromirrors," Journal of Lightwave Technology, vol. 17, No. 5, May 1999.

J. Grade et al., A Large–Deflection Electrostatic Actuator for Optical Switching Applications, Solid–State Sensor and Actuator Workshop, Hilton Head Island, South Carolina, Jun. 4–8, 2000; pp. 97–100.

V. Kaajakari et al.; "Ultrasonic Actuation for MEMS Dormancy–Related Stiction Reduction," In MEMS Reliability for Critical Applications, Proceedings of SAPIE vol. 4180 (2000); pp. 60–65.

T.L. Koch et al., "Anisotropically etched deep gratings for InP/InGaAsP optical devices," J.App. Phys. 62 (8), Oct. 15, 1987.

I. Nishi et al., "Broad–Passband–Width Optical Filter for Multi–Demultiplexer Using a Diffraction Grating and a Retroreflector Prism," Electronics Letters, vol. 21, No. 10, May $9^{th}$ 1985.

P. Phillippe et al., "Wavelength demultiplexer: using echelette gratings on silicon substrate," Applied Optics, vol. 24, No. 7, Apr. 1, 1985.

M. Schilling et al., "Deformation–free overgrowth of reactive ion beam etched submicron structures in InP by liquid phase epitaxy," Appl. Phys. Lett. 49 (12), Sep. 22, 1986.

Z. J. Sun et al., Demultiplexer with 120 channels and 0.29–nm Channel Spacing, IEEE Photonics Technology Letters, vol. 10, No. 1, Jan. 1998.

W. Tang, et al., "Electrostatically Balanced Comb Drive for Controlled Levitation," Reprinted from Technical Digest IEEE Solid–State Sensor and Actuator Workshop, Jun. 1990; pp. 198–202.

L. Torcheux et al., "Electrochemical Coupling Effects on the Corrosion of Silicon Samples in HF Solutions," J. Electrochem.Soc., vol. 142, No. 6, Jun. 1995.

P. VanKessel et al., "A MEMS–Based Projection Display," Proceedings of the IEEE, vol. 86, No. 8, Aug. 1998; pp. 1687–1704.

Microfabricated Silicon High Aspect Ratio Flexures for In–Plane Motion; dissertation by C. Keller, Fall 1998.

Gimballed Electrostatic Microactuators with Embedded Interconnects; dissertation by L. Muller; Spring 2000.

FREE-SPACE OPTICAL WAVELENGTH ROUTING ELEMENT BASED ON STEPWISE CONTROLLED TILTING MIRRORS

CROSS-REFERENCES TO RELATED APPLICATIONS

This application is being filed concurrently with related U.S. patent application Ser. No. 09/899,001, "TWO-DIMENSIONAL FREE-SPACE OPTICAL WAVELENGTH ROUTING ELEMENT BASED ON STEPWISE CONTROLLED TILTING MIRRORS" by Victor Buzzetta, which is herein incorporated by reference in its entirety for all purposes.

BACKGROUND OF THE INVENTION

This application relates generally to optical routing and more specifically to microelectromechanical systems for routing optical signals.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80-channel DWDM system will require thousands of switches to fully cross-connect all the wavelengths. Opto-mechanical switches, which offer acceptable optical specifications, are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

Embodiments of the invention provide a microstructure for steering light that provides enhanced flexibility. The microstructure may be configured to function as an optical switch for directing an optical signal from a single input port to one of at least three output ports. Such configurations may be adapted for use in a wavelength router. Alternatively, the flexibility of the microstructure may be used to achieve improved alignment so that the light-steering efficiency is improved.

In one embodiment, a microstructure for steering light is provided. A pivot member is connected with a structural film and supports a base that includes a reflective coating. A first fixed rotational actuator is connected with the structural film and is configured to rotate the base on the pivot member upon actuation. A first movable hard stop is connected with the structural film. The first movable hard stop is configured such that in each of a plurality of its positions, the base assumes one of a first plurality of tilt positions upon actuation of the first fixed rotational actuator.

In some embodiments, a second fixed rotational actuator is also connected with the structural film and is configured to rotate the base on the pivot member upon actuation. A second movable hard stop is connected with the structural film. Each of a plurality of positions of the second movable hard stop causes the base to assume one of a second plurality of tilt positions upon actuation of the second fixed rotational actuator. The first and second movable hard stops may have their positions correlated with each other, such as by connecting them. In some embodiments, the movable hard stops may be linearly actuated.

In certain embodiments, the movable hard stops comprise a plurality of discrete levels, each of which corresponds with one of the plurality of positions of that hard stop to define one of the plurality of tilt positions. Where two movable hard stops are provided, they may have the same number of discrete levels.

In some embodiments, the pivot member comprises a torsion beam. In other embodiments, the pivot member comprises a cantilever. The reflective coating may comprise gold.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference

DESCRIPTION OF THE SPECIFIC EMBODIMENTS

1. Introduction

The following description sets forth embodiments of an optical routing element. In some embodiments, the optical routing element may be used in an optical wavelength router. Accordingly, embodiments of the invention can be applied to network elements such as optical add-drop multiplexers (OADMs) and wavelength-selective cross-connects (WSXCs), among others, to achieve the goals of optical networking systems.

The general functionality of one optical wavelength router that can be used with the embodiments of the invention is described in detail in the copending, commonly assigned U.S. patent application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber).

The wavelength router thus includes a dispersive element, such as a diffraction grating or prism, which operates to deflect incoming light by a wavelength-dependent amount. Different portions of the deflected light are intercepted by different routing elements. The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. The ITU has also defined standard data modulation rates. The OC-48 modulation corresponds to approximately 2.5 GHz, OC-192 to approximately 10 GHz, and OC-768 to approximately 40 GHz.

2. Wavelength Router Configurations

Figure 1A:
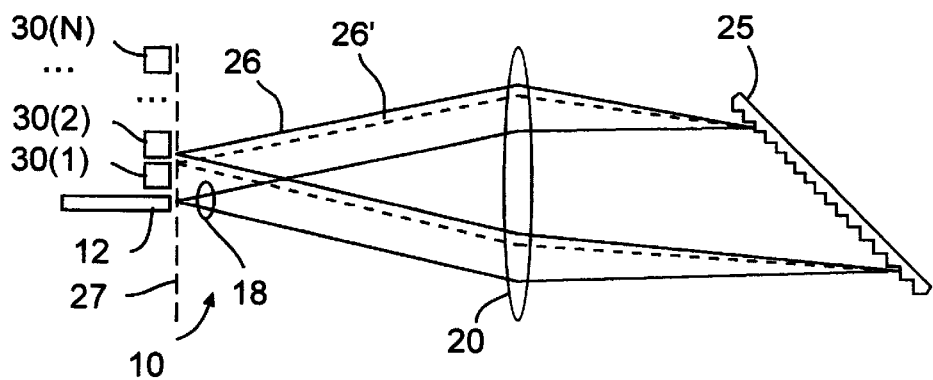
FIGS. 1A, 1B, and 1C are schematic top, side, and end views, respectively, of one embodiment of a wavelength router that uses spherical focusing elements.
Figure 1B:
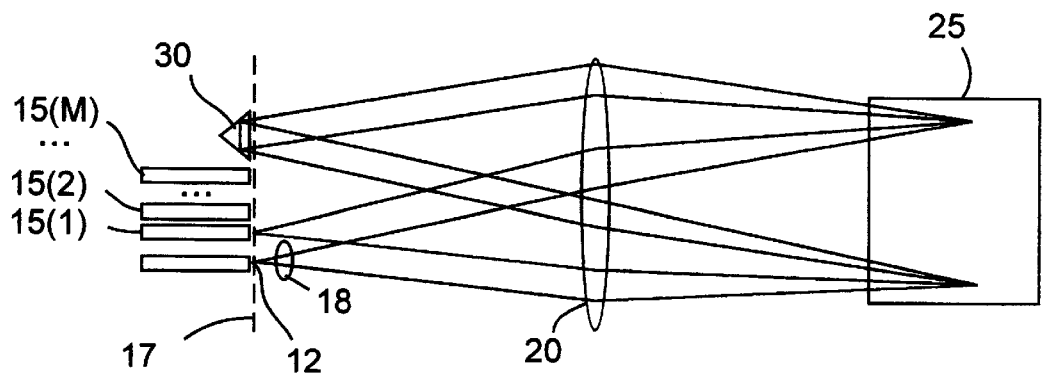
Figure 1C:
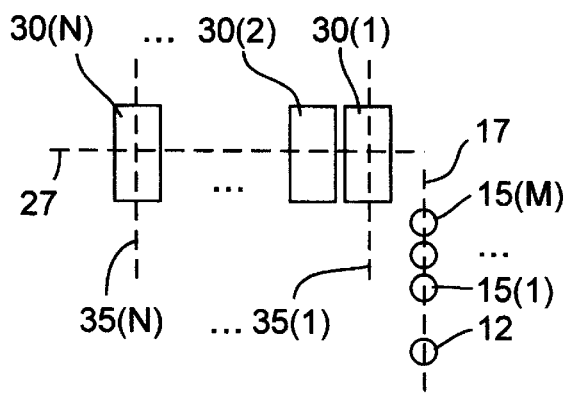

FIGS. 1A, 1B, and 1C are schematic top, side, and end views, respectively of one embodiment of a wavelength router 10. Its general functionality is to accept light having a plurality N of spectral bands at an input port 12, and to direct subsets of the spectral bands to desired ones of a plurality M of output ports, designated 15(1) ... 15(M). The output ports are shown in the end view of FIG. 1C as disposed along a line 17 that extends generally perpendicular to the top view of FIG. 1A. Light entering the wavelength router 10 from input port 12 forms a diverging beam 18, which includes the different spectral bands. Beam 18 encounters a lens 20 that collimates the light and directs it to a reflective diffraction grating 25. The grating 25 disperses the light so that collimated beams at different wavelengths are directed at different angles back towards the lens 20.

Two such beams are shown explicitly and denoted 26 and 26', the latter drawn in dashed lines. Since these collimated beams encounter the lens 20 at different angles, they are focused towards different points along a line 27 in a transverse plane extending in the plane of the top view of FIG. 1A. The focused beams encounter respective ones of a plurality of retroreflectors, designated 30(1) ... 30(N), located near the transverse plane. The beams are directed back, as diverging beams, to the lens 20 where they are collimated, and directed again to the grating 25. On the second encounter with the grating 25, the angular separation between the different beams is removed and they are directed back to the lens 20, which focuses them. The retroreflectors 30 may be configured to send their intercepted beams along a reverse path displaced along respective lines 35(1) ... 35(N) that extend generally parallel to line 17 in the plane of the side view of FIG. 1B and the end view of FIG. 1C, thereby directing each beam to one or another of output ports 15.

Figure 2A:
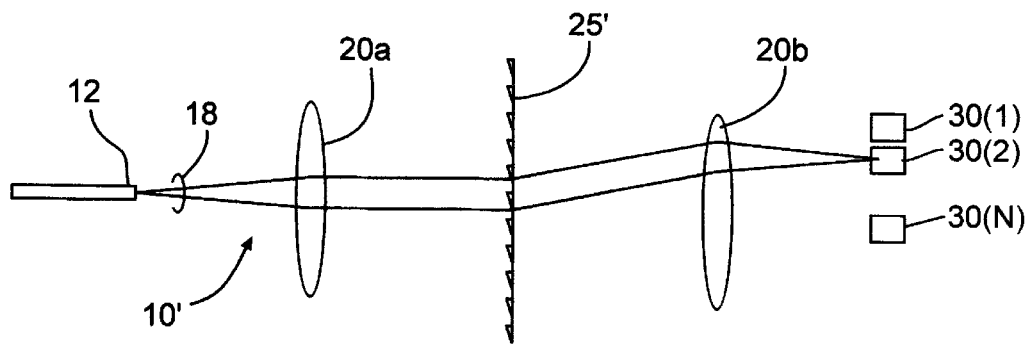
FIGS. 2A and 2B are schematic top and side views, respectively, of a second embodiment of a wavelength router that uses spherical focusing elements.
Figure 2B:
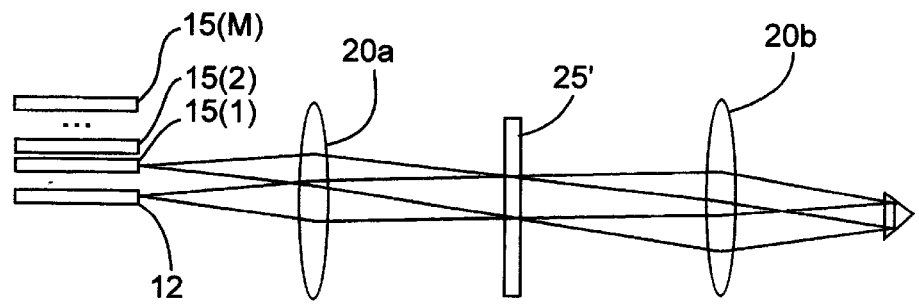

Another embodiment of a wavelength router, designated 10', is illustrated with schematic top and side views in FIGS. 2A and 2B, respectively. This embodiment may be considered an unfolded version of the embodiment of FIGS. 1A–1C. Light entering the wavelength router 10' from input port 12 forms diverging beam 18, which includes the different spectral bands. Beam 18 encounters a first lens 20a, which collimates the light and directs it to a transmissive grating 25'. The grating 25' disperses the light so that collimated beams at different wavelengths encounter a second lens 20b, which focuses the beams. The focused beams are reflected by respective ones of plurality of retroreflectors 30 as diverging beams, back to lens 20b, which collimates them and directs them to grating 25'. On the second encounter, the grating 25' removes the angular separation between the different beams, which are then focused in the plane of output ports 15 by lens 20a.

Figure 3:
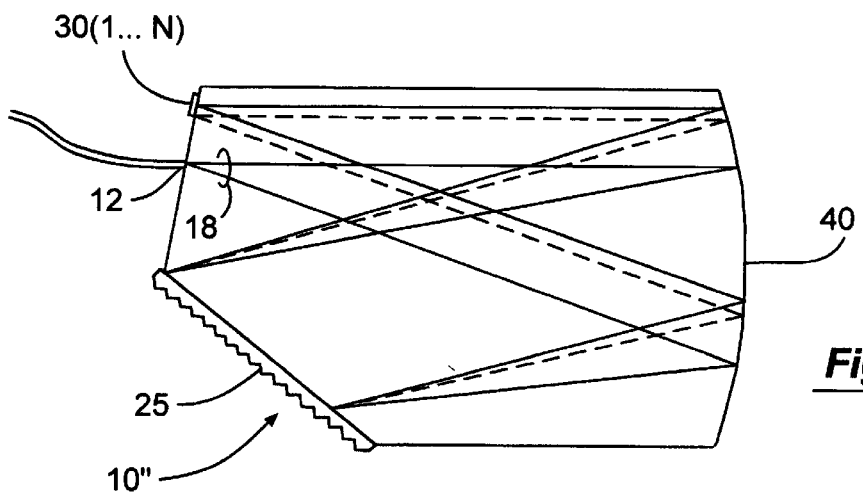
FIG. 3 is a schematic top view of a third embodiment of a wavelength router that uses spherical focusing elements.

A third embodiment of a wavelength router, designated 10", is illustrated with the schematic top view shown in FIG. 3. This embodiment is a further folded version of the embodiment of FIGS. 1A–1C, shown as a solid glass embodiment that uses a concave reflector 40 in place of lens 20 of FIGS. 1A–1C or lenses 20a and 20b of FIGS. 2A–2B.

Light entering the wavelength router 10" from input port 12 forms diverging beam 18, which includes the different spectral bands. Beam 18 encounters concave reflector 40, which collimates the light and directs it to reflective diffraction grating 25, where it is dispersed so that collimated beams at different wavelengths are directed at different angles back towards concave reflector 40. Two such beams are shown explicitly, one in solid lines and one in dashed lines. The beams then encounter retroreflectors 30 and proceed on a return path, encountering concave reflector 40, reflective grating 25', and concave reflector 40, the final encounter with which focuses the beams to the desired output ports.

3. Optical-Switch Retroreflector Implementations

Figure 4A:
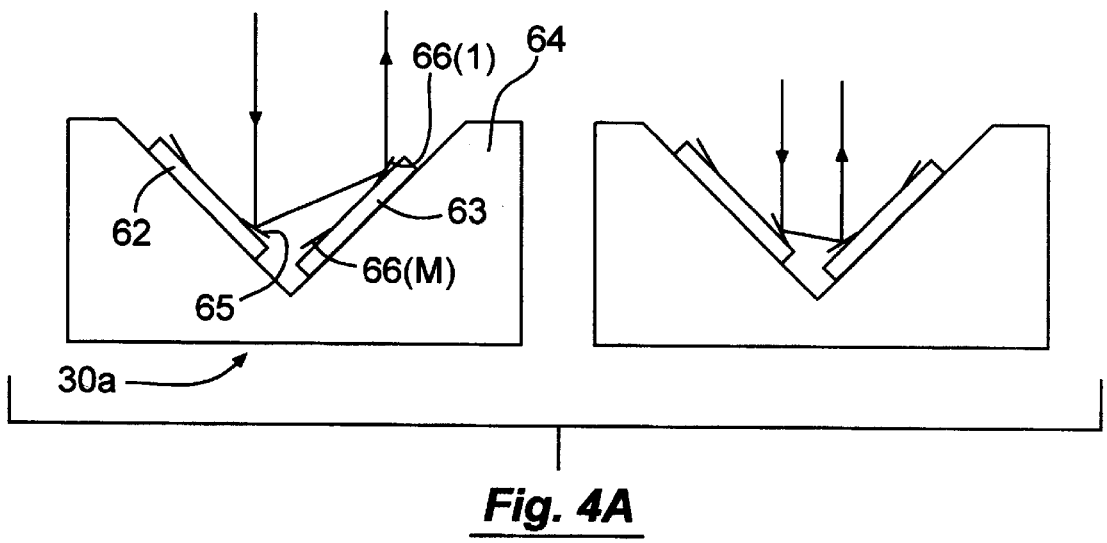
FIGS. 4A and 4B are side and top views of an implementation of a micromirror retroreflector array.
Figure 4B:
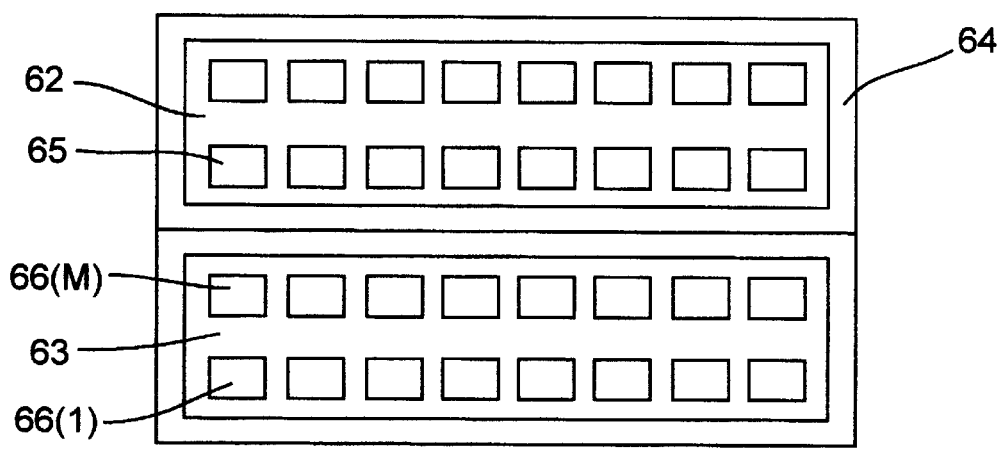

FIG. 4A shows schematically the operation of a retroreflector, designated 30a, that uses two-position micromirror optical switches (sometimes called "1×2 optical switches"). FIG. 4B is a top view. A pair of micromirror arrays 62 and 63 is mounted to the sloped faces of a V-block 64. A single micromirror 65 in micromirror array 62 and a row of micromirrors 66(1 . . . M) in micromirror array 63 define a single retroreflector. Micromirror arrays may conveniently be referred to as the input and output micromirror arrays, with the understanding that light paths are reversible. The left portion of the figure shows micromirror 65 in a first orientation so as to direct the incoming beam to micromirror 66(1), which is oriented 90° with respect to micromirror 65's first orientation to direct the beam back in a direction opposite to the incident direction. The right half of the figure shows micromirror 65 in a second orientation so as to direct the incident beam to micromirror 66(M). Thus, micromirror 65 is moved to select the output position of the beam, while micromirrors 66(1 . . . M) are fixed during normal operation. Micromirror 65 and the row of micromirrors 66 (1 . . . M) can be replicated and displaced in a direction perpendicular to the plane of the figure. While micromirror array 62 need only be one-dimensional, it may be convenient to provide additional micromirrors to provide additional flexibility.

In one embodiment, the micromirror arrays are planar and the V-groove has a dihedral angle of approximately 90° so that the two micromirror arrays face each other at 90°. This angle may be varied for a variety of purposes by a considerable amount, but an angle of 90° facilitates routing the incident beam with relatively small angular displacements of the micromirrors. In certain embodiments, the input micromirror array has at least as many rows of micromirrors as there are input ports (if there are more than one), and as many columns of mirrors as there are wavelengths that are to be selectably directed toward the output micromirror array. Similarly, in some embodiments, the output micromirror array has at least as many rows of micromirrors as there are output ports, and as many columns of mirrors as there are wavelengths that are to be selectably directed to the output ports.

In a system with a magnification factor of one-to-one, the rows of micromirrors in the input array are parallel to each other and the component of the spacing from each other along an axis transverse to the incident beam corresponds to the spacing of the input ports. Similarly, the rows of micromirrors in the output array are parallel to each other and spaced from each other (transversely) by a spacing corresponding to that between the output ports. In a system with a different magnification, the spacing between the rows of mirrors would be adjusted accordingly.

Figure 4C:
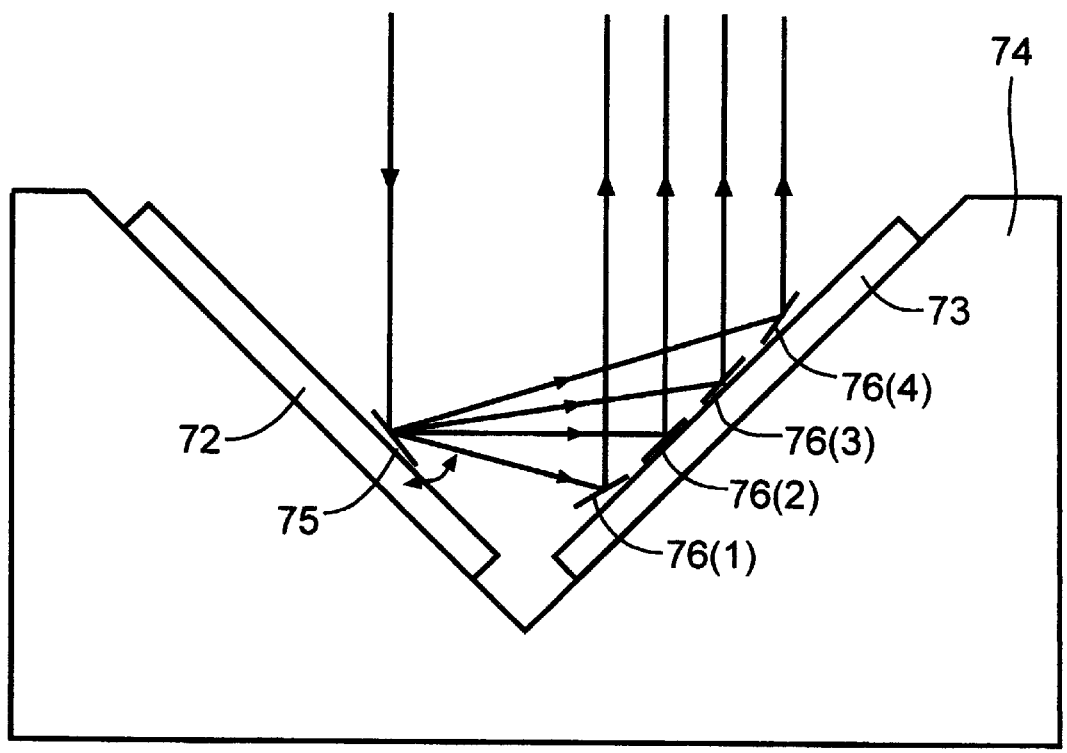
FIG. 4C is a side view of a multiposition micromirror that may be used as a 1×N switch.

Embodiments of the invention permit multiposition switching arrangements in which an optical signal from a signal input fiber may be directed to any of N (>2) output fibers. This is illustrated in FIG. 4C, in which micromirror arrays 72 and 73 are mounted to the sloped faces of V-block 74. A 1×N optical switch is defined by multiposition micromirror 75 and the N fixed micromirrors 76. For each of its multiple positions, micromirror 75 directs the optical signal incident from the input port to one of the fixed micromirrors 76, where it is directed to a corresponding output port.

Embodiments of the invention include methods and structures that permit various tilted positions of micromirrors. These positions may be achieved by using a pivot on which an individual micromirror is tilted. As used herein, the terms "pivot" and "pivot member" are intended to have broad meanings. For example, the pivot or pivot member may be a flexure. In some embodiments, the pivot or pivot member may use a torsion-beam or cantilever arrangement. The terms also encompass other structural elements that may be used to achieve tilted micromirror positions.

Figure 5A:
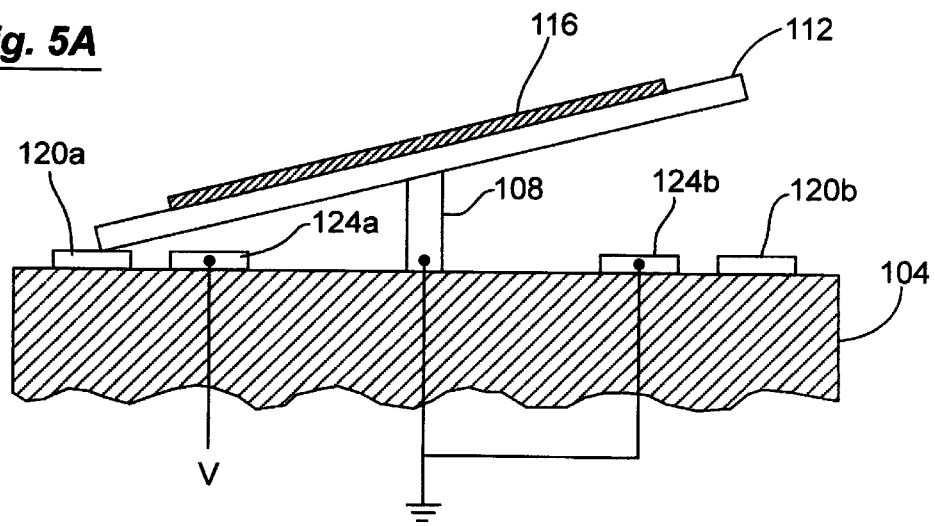
FIGS. 5A and 5B 5C are cross-sectional drawings of a tilting micromirror in two positions effected by actuation of different actuators.
Figure 5B:
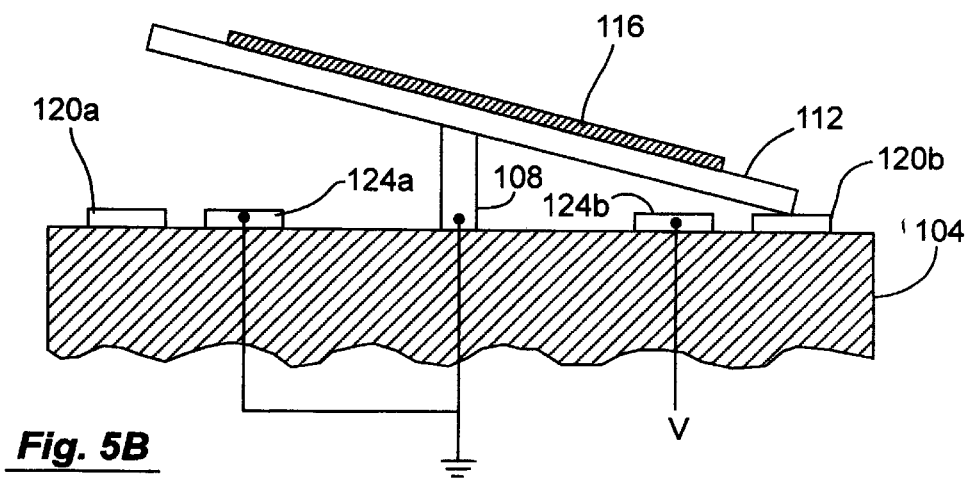

An example is provided in FIGS. 5A and 5B illustrating a particular microelectromechanical system ("MEMS") micromirror structure that implements a bipositional micromirror that may be used in the 1×2 switch. Each micromirror 116 is mounted on a base 112 that is connected by a pivot 108 to an underlying structural film 104. Movement of an individual micromirror 116 is controlled by energizing actuators 124a and/or 124b disposed underneath the micromirror 116 on opposite sides of the pivot 108. Hard stops 120a and 120b are provided to stop the action of the micromirror base 112.

Energizing the actuator 124a on the left side of the pivot 108 causes the micromirror 116 to tilt on the pivot 108 towards that side until one edge of the micromirror base 112 contacts the left hard stop 120a, as shown in FIG. 5A. Alternatively, the actuator 124b on the right side of the pivot 108 may be energized to cause the micromirror 116 to tilt in the opposite direction, as shown in FIG. 5B. Sometimes hard stops 120a and 120b are not provided so that the micromirror base 112 is in direct contact with the structural film 104. The structure shown may be implemented as a "torsion-beam" structure, in which the pivot 108 comprises two structures on opposite sides of the micromirror base 112 (orthogonal to the page), connected with a beam that defines the rotation of the micromirror base 112. Alternatively, the structure may be implemented such that the pivot 108 is a post positioned approximately at the center of the micromirror base 112.

4. Stepwise Controlled Tilting Micromirrors

Figure 5C:
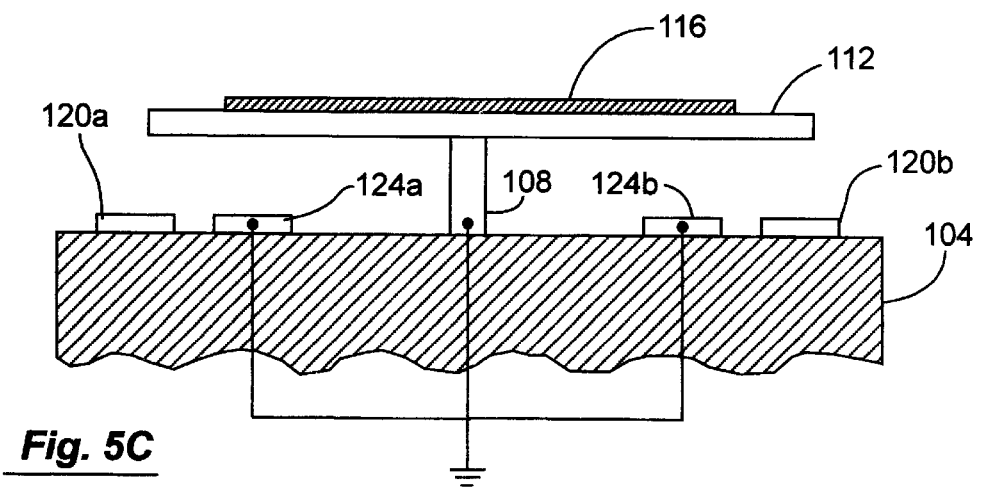

Embodiments of the invention provide movable hard stops such that more than two configurations may be realized with a given micromirror. There are various reasons why such an arrangement is beneficial. For example, by using a configuration in which a micromirror has N (>2) possible configurations, a 1×N optical switch may be provided. Accordingly, as described with respect to FIG. 5C above, the 1×N optical switch may be incorporated within a wavelength router so that an optical signal from an input port may be directed to any of N output ports depending on a state of the 1×N optical switch. This permits the wavelength router to function with greater versatility and increased bandwidth.

Even in embodiments where the micromirror is to be used as a 1×2 optical switch, there are benefits to having an increased number of possible configurations for the micromirror. For example, two of the positions (out of the N available) may be specifically selected to optimize alignment of the micromirror rather than being constrained to two predetermined positions. Once the two optimized positions are selected, the 1×2 optical switch may be operated by moving the micromirror between the two optimized positions. This optimization may be carried out separately for each micromirror in a wavelength router, thereby optimizing the efficiency of the router. Certain of the embodiments described below permit the micromirror to be positioned in configurations that vary in more than a single dimension. Alignment optimization with such multidimensional positioning permits, in some embodiments, even greater optimization of each individual micromirror, translating into even greater operational efficiency of a wavelength router into which they may be incorporated.

a. Movable Hard Stop

FIGS. 6A–6E show one embodiment of the invention in which hard stops may be moved through linear actuation. The micromirror structure, which may be of the torsion-beam type, includes a base 612 supported by a pivot 608 that is connected with a structural film 604. The micromirror 616 is formed with a reflective coating, such as gold, on the base 616. In the illustrated embodiment, two fixed rotational actuators 624a and 624b are provided on either side of the pivot 608 to cause rotation of the micromirror base 612 into different configurations. The fixed rotational actuators 624a and 624b may be activated by establishing a potential difference V between one of the fixed rotational actuators and the micromirror base. For example, applying a potential difference V to the right fixed rotational actuator 624b produces an electrostatic attraction with the micromirror base 612 that causes it to tilt downwards to the right. Similarly, applying a potential difference V to the left fixed rotational actuator 624a produces an electrostatic attraction with the micromirror base 612 that causes it to tilt downwards to the left.

The different micromirror configurations are defined not only by the direction of rotation as dictated by activation of the fixed rotational actuators 624a and 624b, but also by the position of the movable hard stops 620a and 620b, also provided on either side of the pivot 608. The position of each of the movable hard stops 620a and 620b may be adjusted through activation of respective linear actuators 622a and 622b. In the illustrated embodiment, the micromirror arrangement provides, in addition to the neutral horizontal position shown in FIG. 6A, four distinct positions for the micromirror 616. This is accomplished with linear actuators 622a and 622b that each permit the respective hard stops 620a and 620b to be in one of two positions.

Figure 6A:
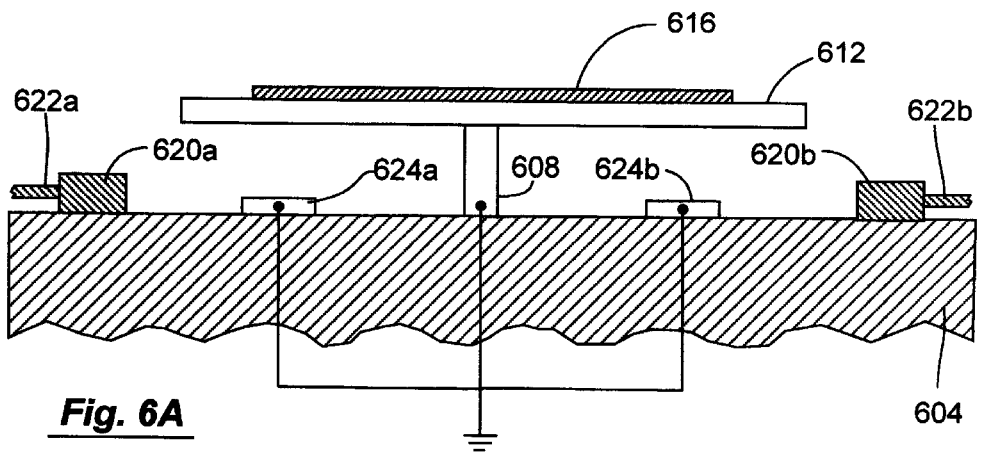
FIGS. 6A, 6B, 6C, 6D, and 6E are cross-sectional drawings of one embodiment of a multiposition tilting micromirror assembly using linear actuators.
Figure 6B:
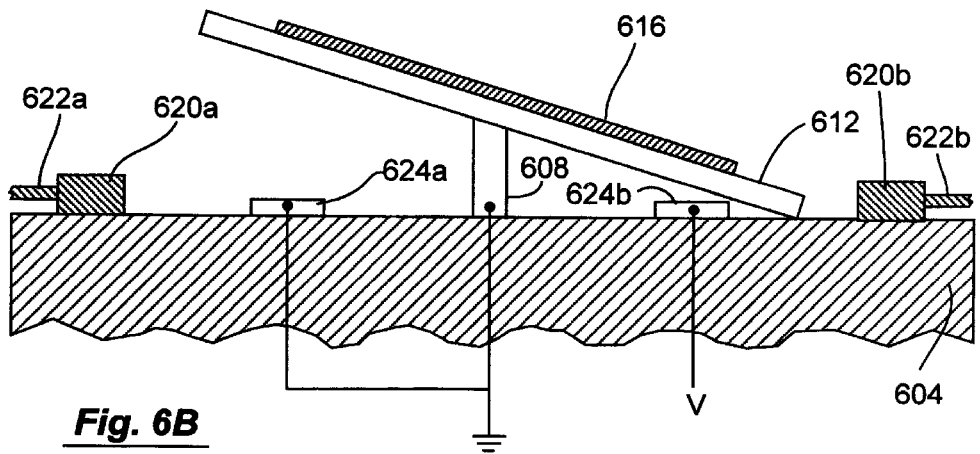
Figure 6C:
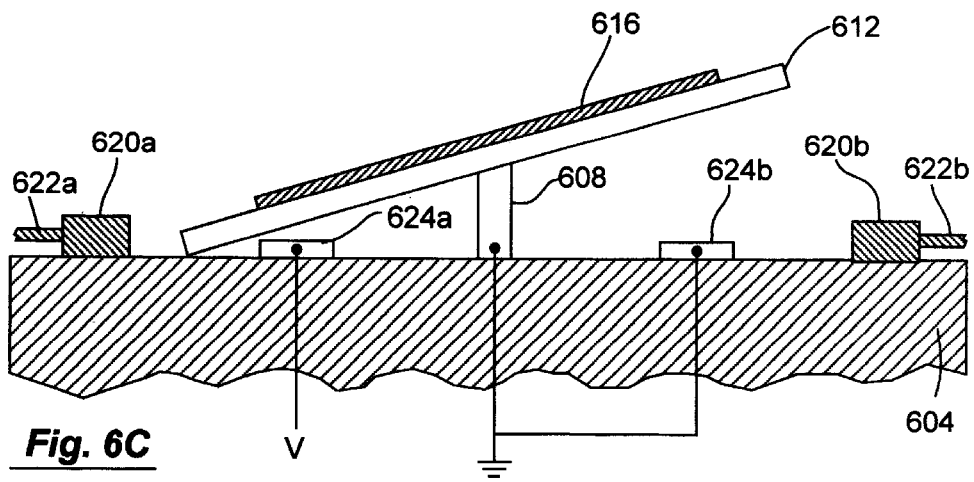

FIGS. 6B and 6C show the operation of the micromirror arrangement when both hard stops 620a and 620b are positioned laterally outside an orthogonal projection of the micromirror base 612 onto the structural film 604. "Orthogonal" is meant to refer to perpendicularity with respect to the plane of the structural film. In such a configuration, neither hard stop 620a nor 620b will be encountered by the base 612 when it rotates upon activation of one of the fixed rotational actuators 624a or 624b. Thus, the micromirror functions in the same fashion as the arrangement in FIGS. 5A and 5B, except that the micromirror base 612 comes into contact with the substrate 604 when in a rotated position. In an alternative embodiment, fixed hard stops may additionally be provided so that the micromirror base comes into contact with a fixed hard stop instead of in direct contact with the structural film 604.

Figure 6D:
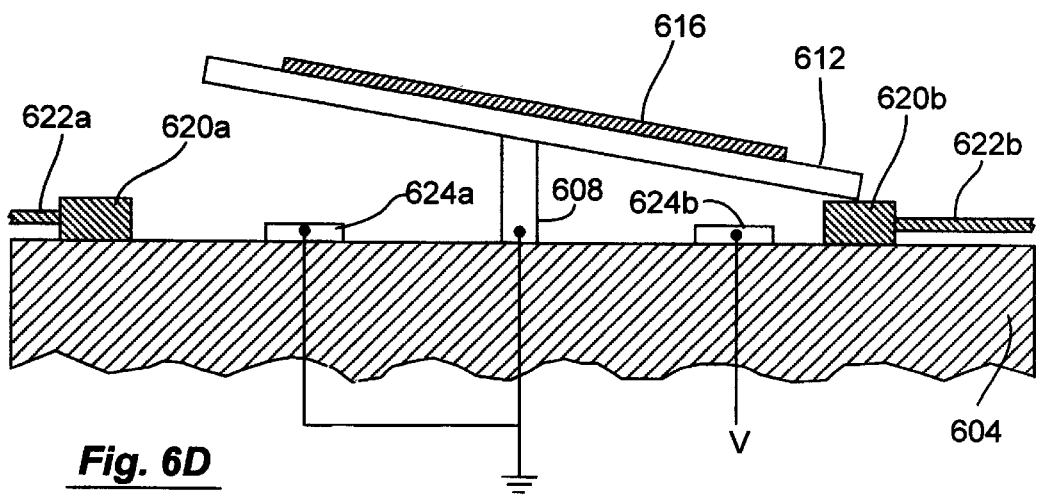
Figure 6E:
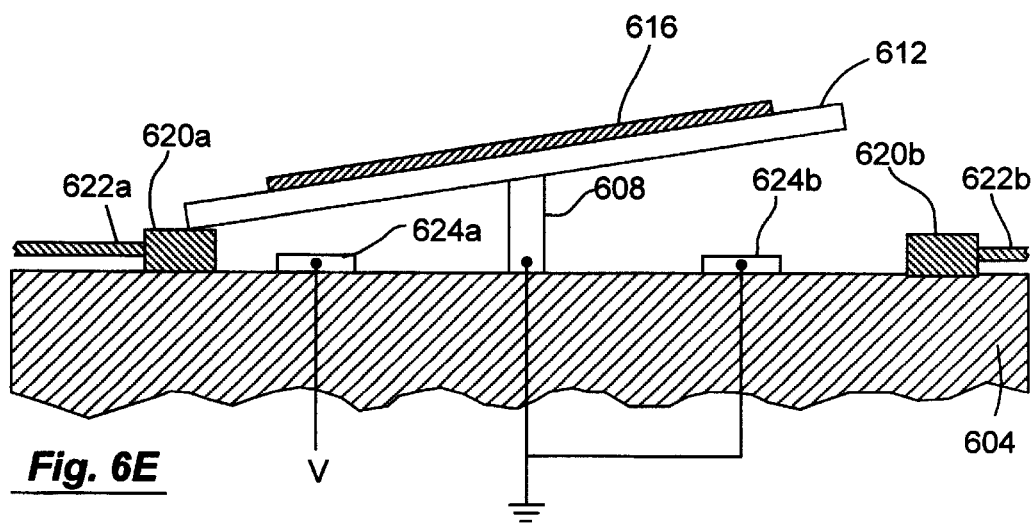

FIGS. 6D and 6E show that two additional configurations for the micromirror arrangement are provided when at least one of the hard stops 620a or 620b is moved laterally within the orthogonal projection of the micromirror base 612 onto the structural film 604 by activation of the respective linear actuator 622a or 622b. When the right hard stop 620b is moved to its second position by the right linear actuator 622b, and the right fixed rotational actuator 624b is also activated, as shown in FIG. 6D, the micromirror arrangement has a tilted configuration in which the micromirror base 612 is supported above the structural film 604. The corresponding arrangement for a left-tilted micromirror configuration with the micromirror base 612 supported above the structural film 604 is shown in FIG. 6E. There, the left hard stop 620a is moved to its second position by the left linear actuator 622a, and the left fixed rotational actuator is activated.

It is noted that the micromirror tilts shown in FIGS. 6D and 6E may be achieved with activation of a single linear actuator 622a or 622b as appropriate, or by activation of both linear actuators 622a and 622b. As such, another arrangement that achieves the same four micromirror positions (in addition to the neutral horizontal position shown in FIG. 6A) may be achieved with a single linear actuator. One such arrangement is illustrated in FIGS. 7A–7D. In this embodiment, the micromirror base 712 is covered with a reflective coating 716 and supported by a pivot 708, which is connected with a structural film 724. Fixed rotational actuators 724a and 724b are provided on either side of the pivot 708 to cause the micromirror base 712 to tilt to the left or right when they are activated. Movable hard stops 720a and 720b are connected with each other with connector 723 so that the separation between them remains fixed in each configuration shown in FIGS. 7A–7D. The connected movable hard stops 720a and 720b are moved by actuation of linear actuator 722, which may provide two positions in the illustrated embodiment.

Figure 7A:
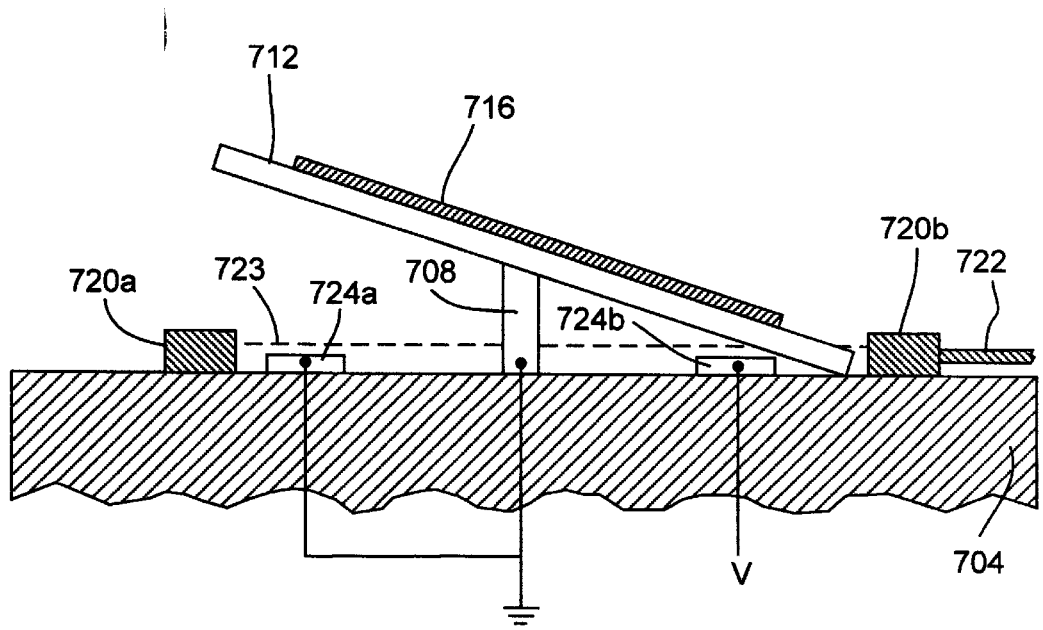
FIGS. 7A, 7B, 7C, and 7D are cross-sectional drawings of an embodiment of a multiposition tilting micromirror assembly using a single linear actuator.
Figure 7B:
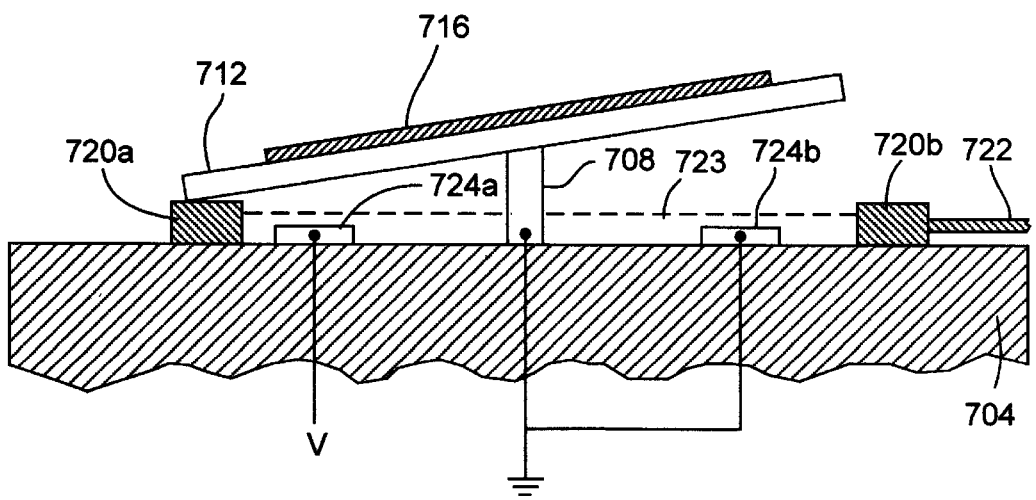

Thus, when the linear actuator 722 is configured in the first of its two positions, as shown in FIGS. 7A and 7B, the micromirror may be tilted to two orientations upon activation of one of the fixed rotational actuators 724a or 724b. The first position may be defined by the fact that the left hard stop 720a is underneath the micromirror base 712, but the right hard stop 720b is not. "Underneath" is used in the specific sense that the left hard stop 720a is laterally within an orthogonal projection of the micromirror base 712 on the structural film 704 and the right hard stop 720b is laterally outside that projection. Upon activation of fixed rotational actuator 724b, therefore, the micromirror base 712 tilts to the right such that the base 712 is in contact with the structural film 704. Upon activation of fixed rotational actuator 724a, the micromirror base 712 tilts to the left and such that the base 712 is in contact with hard stop 720a.

Figure 7C:
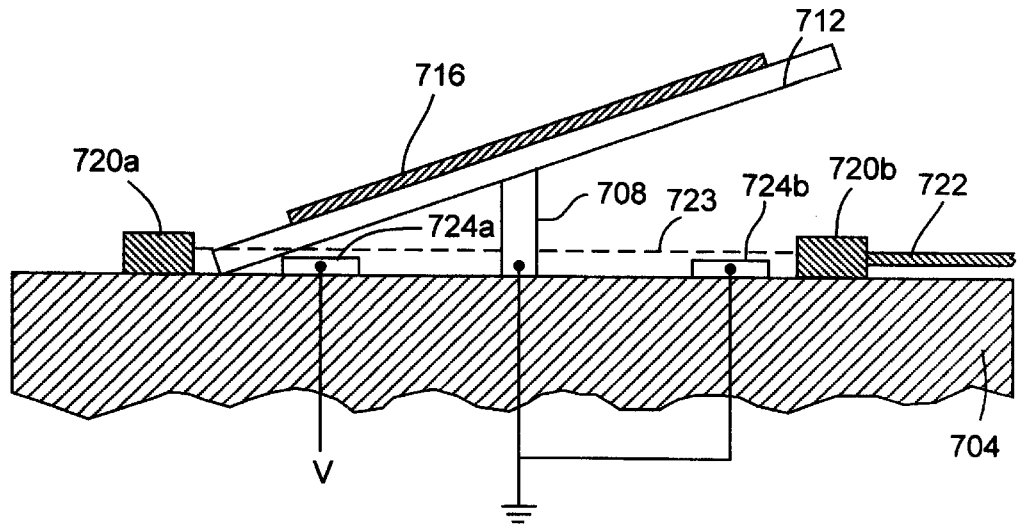
Figure 7D:
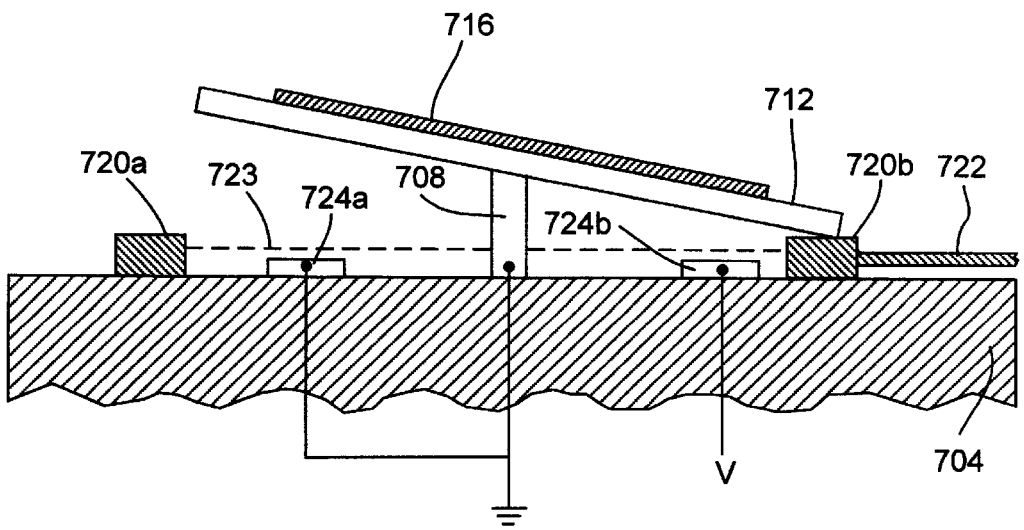

The complementary micromirror orientations are shown in FIGS. 7C and 7D where the linear actuator 722 is in the second of its two positions. In this position, the right hard stop 720b is underneath the micromirror base, but the left hard stop 720a is not. Accordingly, when the left fixed rotational actuator 724a is activated, as in FIG. 7C, the micromirror is tilted to the left with the micromirror base 712 in contact with the structural film 704. When instead the right fixed rotational actuator 724b is activated, as in FIG. 7D, the micromirror is tilted to the right with the micromirror base 712 support by the right hard stop 720b. In an alternative embodiment, fixed hard stops may additionally be provided so that in either or both of the configurations shown in FIGS. 7A and 7D, the micromirror base 712 contacts a fixed hard stop instead of making direct contact with the structural film 704.

Figure 7E:
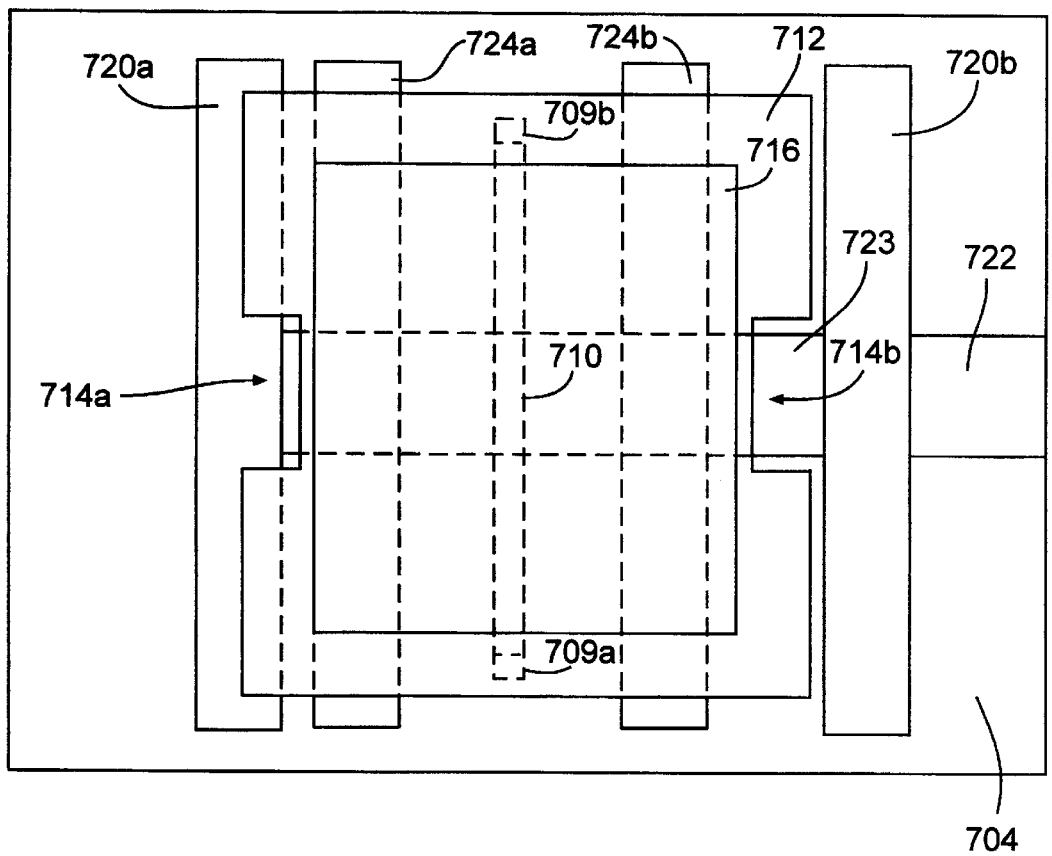
FIG. 7E is a top view of an embodiment of a multiposition tilting micromirror assembly using a single linear actuator.

In the single-linear-actuator embodiments, the micromirror assembly should be constructed so that the connector 723 does not interfere with operation of the assembly. There are various ways in which the assembly may be structured to avoid such interference, one of which is shown in FIG. 7E, which is a top view of a configuration corresponding to FIG. 7A, i.e. the micromirror base 712 is tilted to the right with the right rotational actuator 724b activated and the linear actuator 722 in the first position. Hidden structures are shown in shadow line. In the illustrated embodiment, the pivot is configured as a torsion beam 710 supported by two support structures 709a and 709b. The micromirror base 712 includes notches 714a and 714b configured such that sufficient space is provided for the micromirror base 712 to rotate so as to make contact with the structural film 704 without contacting the connector 723. With the configuration shown, the notches 714a and 714b do not affect the reflective coating 716 so that the optical properties of the micromirror arrangement are unaffected.

In alternative embodiments, different pivot mechanisms for the micromirror base may be used. For example, in one alternative embodiment, a cantilever-type pivot is provided in which the micromirror base is tilted at its side rather than near its middle. For this and other pivot mechanisms, the linearly actuated hard stops may be used to provide different tilt configurations.

b. Multilevel Movable Hard Stops

In other embodiments, a greater number of micromirror orientations is provided with multilevel movable hard stops. In one such embodiment, the multilevel movable hard stops are configured with a staircase structure, the number of levels corresponding to the number of stairs in the staircase. With a movable left hard stop having $n_L$ levels and a movable right hard stop having $n_R$ levels, the total number of possible micromirror orientations is $n_L + n_R + 3$, including the neutral horizontal orientation and two orientations in which the micromirror base is in contact with the structural film. The number of positions for the hard stops should be at least $n_L + 1$ and $n_R + 1$ to accommodate all of the available levels. There are various ways in which the multilevel hard stops may be configured to stop the rotation of the micromirror base at its different levels. One way is to use linear actuation, as illustrated in FIGS. 8A–8F, although other ways, including flexure bending and rotation, are also within the scope of the invention.

FIGS. 8A–8F show cross-sectional views of a micromirror arrangement that uses multilevel movable hard stops. A reflective coating 816 is provided on a micromirror base 812, which is connected with a structural film 804 by pivot 808. Fixed rotational actuators 824a and 824b provided on either side of the pivot 808 provide means for causing the micromirror base 812 to tilt into different orientations upon activation. In the illustrated embodiment, movable hard stops 820a and 820b, each having two levels, are provided. While the number of levels provided for each of the hard stops is the same, and they are shown at the same height above the structural film 804, the invention is not so restricted. The hard stops 820a and 820b may be configured asymmetrically, with different numbers of levels at different heights. The hard stops 820a and 820b are connected with connector 823 and moved simultaneously with linear actuator 822. In alternative embodiments, the hard stops may be moved independently with separate actuators so that connector 823 is unneeded.

Figure 8A:
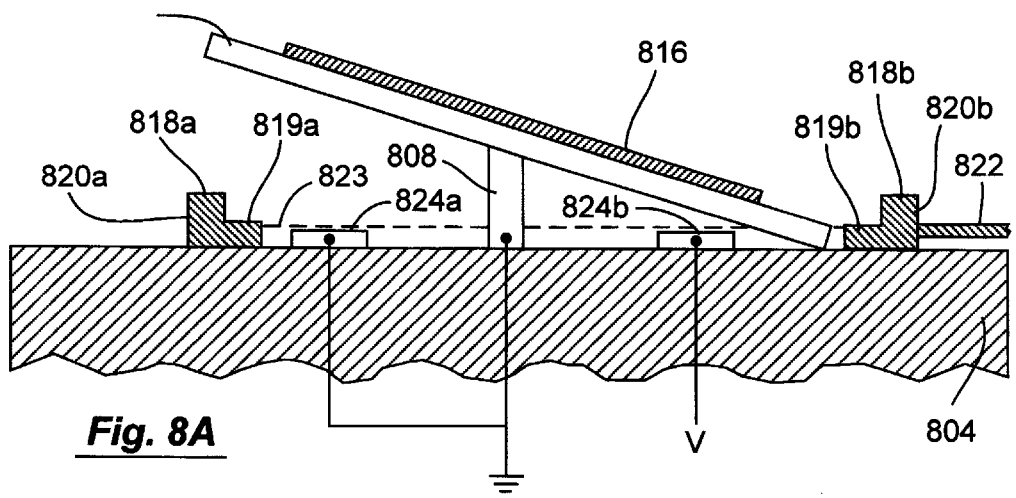
FIGS. 8A, 8B, 8C, 8D, 8E, and 8F are cross-sectional drawings of a further embodiment of a multiposition tilting micromirror assembly using a single linear actuator.
Figure 8B:
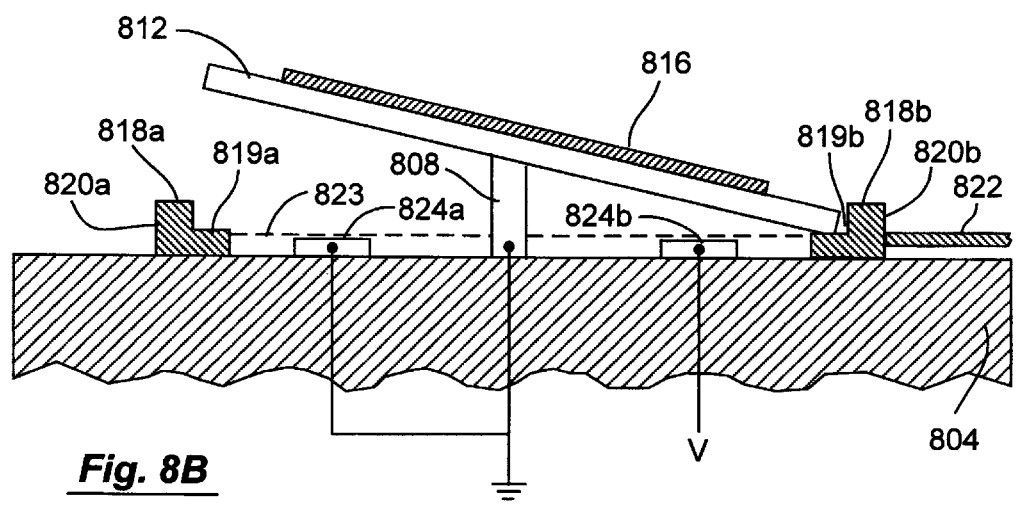
Figure 8C:
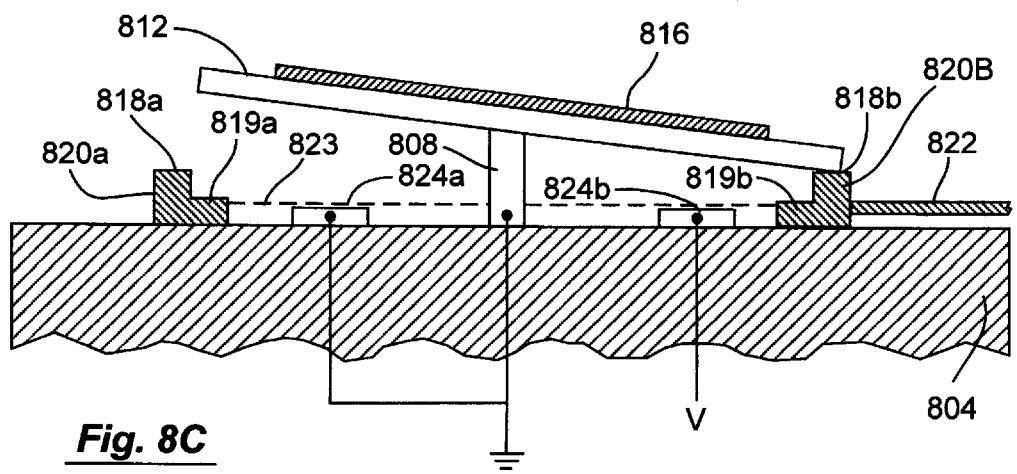

In the embodiments illustrated in FIGS. 8A–8F, $n_L = n_R = 2$, so that the total number of orientations for the micromirror assembly, including the neutral horizontal position, is seven. The number of positions for the linear actuator 822 is three; this accommodates orientations defined by contact of the micromirror base 812 with the structural film and with each of the two levels of each hard stop. Thus, FIGS. 8A–8C show the orientations of the micromirror assembly when the right fixed rotational actuator 824b is activated for each of the three linear-actuator positions. In FIG. 8A, the right hard stop 820b is not underneath the micromirror base 812, which therefore contacts the structural film 804 directly. In FIG. 8B, only the first level 819b of the right hard stop 820b is underneath the micromirror base 812, so that the base 812 therefore is supported by the first level 819b to produce a different angle of inclination. In FIG. 8C, the second level 818b of the right hard stop 820b is underneath the micromirror base 812, so that still a different angle of inclination results from contact between the second level 818b and the micromirror base 812.

Figure 8D:
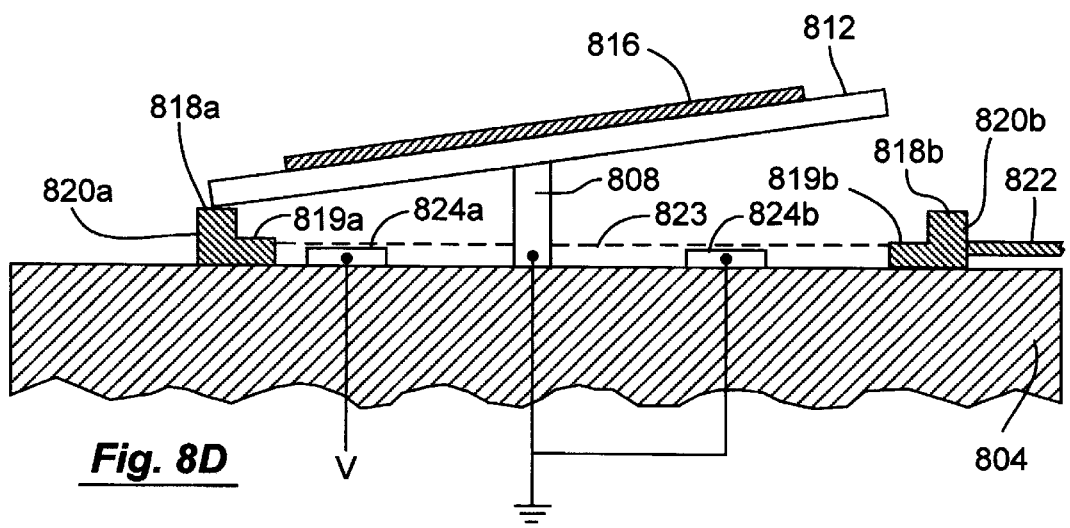
Figure 8E:
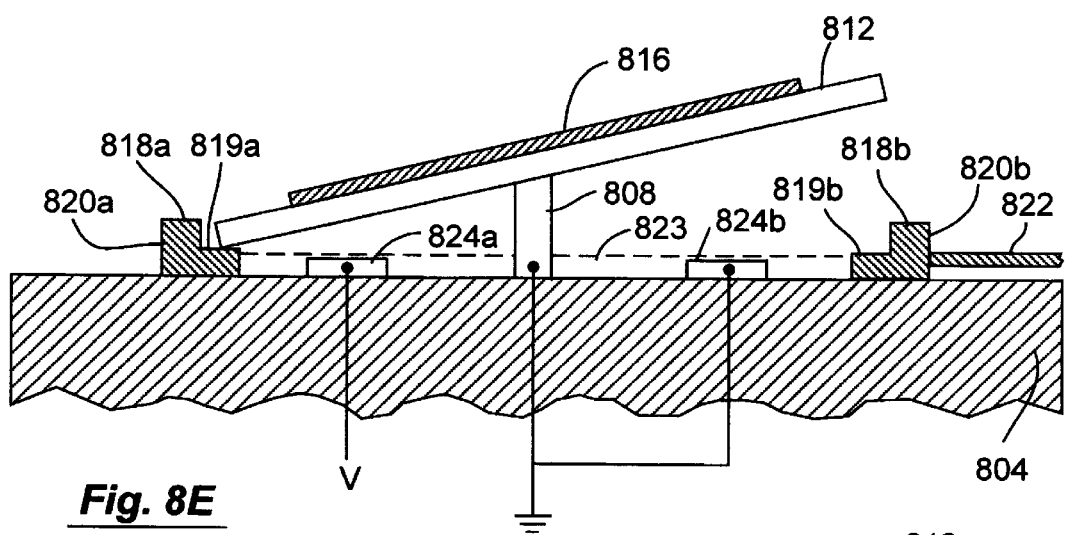
Figure 8F:
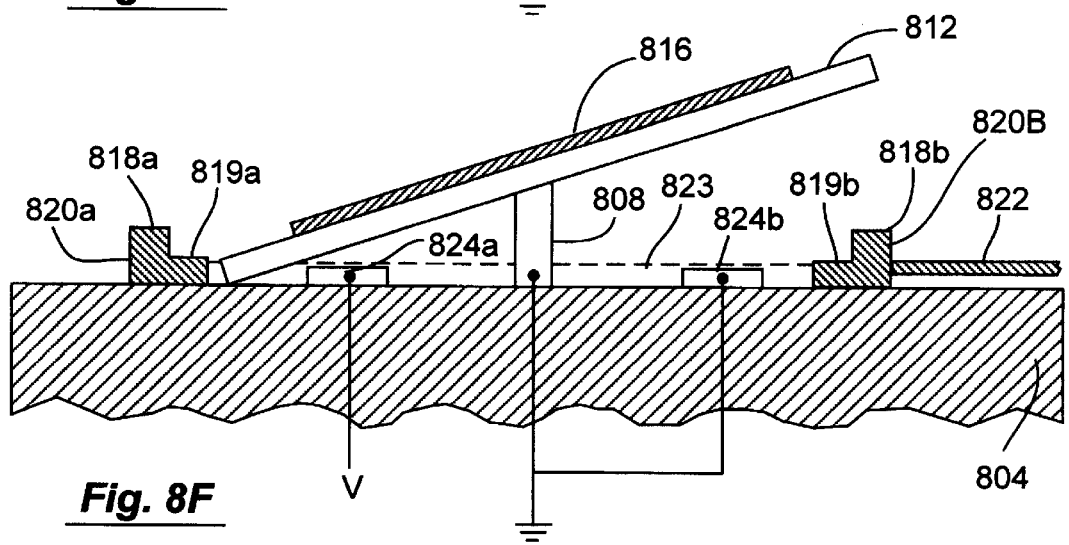

Similarly, FIGS. 8D–8F show the orientation of the micromirror assembly respectively for the same three positions of the linear actuator 822 as FIGS. 8A–8C, except that the left fixed rotational actuator 824a is activated instead of the right fixed rotational actuator 824b. Thus, in FIG. 8D, the second level 818a of the left hard stop 820a is underneath the micromirror base 812, and the orientation of the micromirror assembly is defined by contact between the micromirror base 812 and the second level 818a. In FIG. 8E, only the first level 819a of the left hard stop 819a is underneath the micromirror base 812 so that contact between the first level 819a and the micromirror base 812 defines a different orientation. Finally, in FIG. 8F, no part of the right hard stop 820a is underneath the micromirror base 812 so that a further orientation results from contact with the structural film 804.

In one alternative embodiment, supplementary hard stops may additionally be provided so that in one or both of the configurations corresponding to FIGS. 8A and 8F, the micromirror base 812 is in contact with a hard stop instead of with the structural film 804. Such supplementary hard stops may be fixed in position. It will also be appreciated that the number of available orientations increases as the movable hard stops 820a and 820b are provided with additional levels. Furthermore, different pivot mechanisms for the micromirror base may be used in conjunction with the multilevel movable hard stops. For example, in one alternative embodiment, a cantilever-type pivot is provided in which the micromirror base is tilted at its side rather than near its middle.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A microstructure for steering light, the microstructure comprising:
   a structural film;
   a pivot member connected with the structural film and supporting a base, the base including a reflective coating;
   a first fixed rotational actuator connected with the structural film and configured to rotate the base on the pivot member upon actuation; and
   a first movable hard stop connected with the structural film, wherein in each of a plurality of positions of such first movable hard stop the base assumes one of a first plurality of tilt positions upon actuation of the first fixed rotational actuator.

2. The microstructure recited in claim 1 wherein the first movable hard stop is linearly actuated.

3. The microstructure recited in claim 1 further comprising:
   a second fixed rotational actuator connected with the structural film and configured to rotate the base on the pivot member upon actuation; and
   a second movable hard stop connected with the structural film, wherein in each of a plurality of positions of such second movable hard stop the base assumes one of a second plurality of tilt positions upon actuation of the second fixed rotational actuator.

4. The microstructure recited in claim 3 wherein each of the plurality of positions of such first movable hard stop is correlated with one of the plurality of positions of such second movable hard stop.

5. The microstructure recited in claim 4 wherein the first and second movable hard stops are connected with a connection member.

6. The microstructure recited in claim 3,
   wherein such first movable hard stop comprises a first plurality of discrete levels, each of which corresponds with one of the plurality of positions of such first movable hard stop to define one of the first plurality of tilt positions; and
   wherein such second movable hard stop comprises a second plurality of discrete levels, each of which corresponds with one of the plurality of positions of such second movable hard stop to define one of the second plurality of tilt positions.

7. The microstructure recited in claim 6 wherein the first and second movable hard stops comprise the same number of discrete levels.

8. The microstructure recited in claim 1 wherein such first movable hard stop comprises a plurality of discrete levels, each of which corresponds with one of the plurality of positions of such first movable hard stop to define one of the first plurality of tilt positions.

9. The microstructure recited in claim 1 wherein the pivot member comprises a torsion beam.

10. The microstructure recited in claim 1 wherein the pivot member comprises a cantilever.

11. The microstructure recited in claim 1 wherein the reflective coating comprises gold.

12. A method for fabricating a microstructure for steering light, the method comprising:
   forming a pivot member on a structural film;
   forming a base on the pivot member;
   depositing a reflective coating on the base;
   forming a first fixed rotational actuator over the structural film, the first fixed rotational actuator being configured to rotate the base on the pivot member upon actuation; and
   forming a first movable hard stop over the structural film, such first movable hard stop being configured such that in each of a plurality of positions of such first movable hard stop the base assumes one of a first plurality of tilt positions upon actuation of the first fixed rotational actuator.

13. The method recited in claim 12 wherein the first movable hard stop is linearly actuated.

14. The method recited in claim 12 further comprising:
   forming a second fixed rotational actuator over the structural film, the second fixed rotational actuator being configured to rotate the base on the pivot member upon actuation; and
   forming a second movable hard stop over the structural film, such second movable hard stop being configured such that in each of a plurality of positions of such second movable hard stop the base assumes one of a second plurality of tilt positions upon actuation of the second rotational actuator.

15. The method recited in claim 14 further comprising correlating each of the plurality of positions of such first movable hard stop with one of the plurality of positions of such second movable hard stop.

16. The method recited in claim 15 wherein correlating each of the plurality of positions of such first movable hard stop with one of the plurality of positions of such second movable hard stop comprises connecting such first movable hard stop with such second movable hard stop.

17. The method recited in claim 14,
   wherein forming such first movable hard stop comprises forming a first plurality of discrete levels on such first movable hard stop, each of which corresponds with one of the plurality of positions of such movable hard stop to define one of the first plurality of tilt positions; and
   wherein forming such second movable hard stop comprises forming a second plurality of discrete levels on such second movable hard stop, each of which corresponds with one of the plurality of positions of such movable hard stop to define one of the second plurality of tilt positions.

18. The method recited in claim 17 wherein the same number of discrete levels are formed on the first and second movable hard stops.

19. The method recited in claim 12 wherein forming such first movable hard stop comprises forming a first plurality of discrete levels on such first movable hard stop, each of which corresponds with one of the plurality of positions of such movable hard stop to define one of the first plurality of tilt positions.

20. The method recited in claim 12 wherein forming the pivot member comprises forming a torsion beam.

21. The method recited in claim 12 wherein forming the pivot member comprises forming a cantilever.

22. The method recited in claim 12 wherein the reflective coating comprises gold.

23. A method for steering light from an input port to one of a plurality of output ports, the method comprising:
   moving a movable hard stop over a structural film to one of a plurality of positions for such movable hard stop;
   tilting an end of a micromirror assembly towards the structural film by applying an electrostatic force, wherein the micromirror assembly assumes one of a plurality of tilt positions defined by the plurality of positions for such movable hard stop; and
   reflecting light provided by such input port off the micromirror assembly to such one output port.

24. The method recited in claim 23 wherein moving the movable hard stop comprises translating the movable hard stop.

25. The method recited in claim 23 wherein the movable hard stop is one of a plurality of such movable hard stops configured to define the plurality of tilt positions.

26. The method recited in claim 23 wherein the movable hard stop comprises a plurality of discrete levels, each of which corresponds with one of the plurality of positions of such movable hard stop to define one of the plurality of tilt positions.

27. A method for defining alignment of a plurality of micromirror assemblies between input and output ports, each such micromirror assembly including a base pivotally connected with a structural film, the base having a reflective coating, the method comprising, for each such micromirror assembly:

moving a movable hard stop over the structural film to a plurality of positions;

for each such position,
tilting an end of such micromirror assembly towards the structural film by applying an electrostatic force, wherein such micromirror assembly assumes one of a plurality of tilt positions defined by the plurality of positions for such movable hard stop; and
measuring an alignment acceptability for such position by reflecting light from one such input port off the micromirror assembly; and determining which of such positions provides the greatest alignment acceptability.

28. The method recited in claim 27 wherein moving the movable hard stop comprises translating the movable hard stop.

29. The method recited in claim 27 wherein the movable hard stop is one of a plurality of such movable hard stops configured to define the plurality of tilt positions for each such micromirror assembly.

30. The method recited in claim 27 wherein the movable hard stop comprises a plurality of discrete levels, each of which corresponds with one of the plurality of positions of such movable hard stop to define one of the plurality of tilt positions for each such micromirror assembly.

31. A microstructure for steering light, the microstructure comprising:

support means;

tiltable micromirror means connected with the support means;

first electrostatic-field-generation means for providing a first electrostatic field to tilt the tiltable micromirror means upon actuation; and first movable stop means connected with the support means for defining a first plurality of tilt positions of the tiltable micromirror means in accordance with a plurality of positions for the first movable stop means.

32. The microstructure recited in claim 31 wherein the movable stop means is linearly actuated.

33. The microstructure recited in claim 31 further comprising:

second electrostatic-field-generation means for providing a second electrostatic field to tilt the tiltable micromirror means upon actuation; and second movable stop means connected with the support means for defining a second plurality of tilt positions of the tiltable micromirror means in accordance with a plurality of positions for the second movable stop means.

34. The microstructure recited in claim 33 further comprising connection means to connect the first movable stop means with the second movable stop means.

35. The microstructure recited in claim 31 wherein the first movable stop means comprises a plurality of discrete levels, each of which corresponds with one of the plurality of positions for the first movable stop means to define one of the first plurality of tilt positions.

36. A wavelength router for receiving, at an input port, light having a plurality of spectral bands and directing subsets of the spectral bands to respective ones of a plurality of output ports, the wavelength router comprising:

a free-space optical train disposed between the input port and the output ports providing optical paths for routing the spectral bands, the optical train including a dispersive element disposed to intercept light traveling from the input port; and a routing mechanism having at least one dynamically configurable routing element to direct a given spectral band to different output ports depending on a state of the dynamically configurable routing element, wherein the dynamically configurable routing element includes:

a micromirror assembly connected with a structural film by a pivot member;

a first fixed rotational actuator connected with the structural film and configured to rotate the micromirror assembly on the pivot member upon actuation; and a first movable hard stop connected with the structural film, wherein in each of a plurality of positions of such first movable hard stop the micromirror assembly assumes one of a first plurality of tilt positions upon actuation of the first fixed rotational actuator in accordance with the state of the dynamically configurable routing element.

37. The wavelength router recited in claim 36 wherein the first movable hard stop is linearly actuated.

38. The wavelength router recited in claim 36 wherein the dynamically configurable routing element further includes:

a second fixed rotational actuator connected with the structural film and configured to rotate the micromirror assembly on the pivot member upon actuation; and a second movable hard stop connected with the structural film, wherein in each of a plurality of positions of such second movable hard stop the micromirror assembly assumes one of a second plurality of tilt positions upon actuation of the second fixed rotational actuator in accordance with the state of the dynamically configurable routing element.

39. The wavelength router recited in claim 38 wherein the first and second movable hard stops are connected.

40. The wavelength router recited in claim 36 wherein such first movable hard stop comprises a first plurality of discrete levels, each of which corresponds with one of the plurality of positions of such first movable hard stop to define one of the first plurality of tilt positions.

* * * * *